United States Patent
Passler

(10) Patent No.: US 11,275,171 B2
(45) Date of Patent: Mar. 15, 2022

(54) LOCATION USING ROUND TRIP TIME VECTORS USING AN AIRBORNE PLATFORM

(71) Applicant: SR Technologies, Inc., Davie, FL (US)

(72) Inventor: Mark Passler, Boca Raton, FL (US)

(73) Assignee: SR Technologies, Inc., Sunrise, FL (US)

(*) Notice: Subject to any disclaimer, the term of this patent is extended or adjusted under 35 U.S.C. 154(b) by 365 days.

(21) Appl. No.: 16/695,548

(22) Filed: Nov. 26, 2019

(65) Prior Publication Data

US 2020/0166630 A1 May 28, 2020

Related U.S. Application Data

(60) Provisional application No. 62/771,430, filed on Nov. 26, 2018.

(51) Int. Cl.
| | |
|---|---|
| *G01S 13/76* | (2006.01) |
| *H04W 64/00* | (2009.01) |
| *H04W 4/02* | (2018.01) |
| *G01S 13/87* | (2006.01) |

(52) U.S. Cl.
CPC .......... *G01S 13/76* (2013.01); *H04W 4/02* (2013.01); *H04W 64/00* (2013.01); *G01S 13/878* (2013.01)

(58) Field of Classification Search
CPC ..... H04W 4/023; H04W 4/027; H04W 64/00; H04W 88/08; H04W 4/026; G01S 19/48; G01S 19/14; G01S 19/42; G01S 19/51; G01S 5/0257; G01S 5/0284
See application file for complete search history.

(56) References Cited

U.S. PATENT DOCUMENTS

| | | | | |
|---|---|---|---|---|
| 5,359,332 A | * | 10/1994 | Allison | G01S 19/04 342/357.42 |
| 6,067,045 A | * | 5/2000 | Castelloe | G01S 5/02 342/357.43 |
| 2002/0167444 A1 | * | 11/2002 | Lee | H04W 64/00 342/387 |
| 2006/0262008 A1 | * | 11/2006 | Sanyal | G01S 13/86 342/120 |
| 2009/0253423 A1 | * | 10/2009 | Kullberg | H04M 1/72463 455/419 |

(Continued)

OTHER PUBLICATIONS

LTE Advance 2014, "Angle-of-Arrival" (Year: 2014).*

(Continued)

*Primary Examiner* — Dung Hong

(74) *Attorney, Agent, or Firm* — Christopher & Weisberg, P.A.

(57) ABSTRACT

A method and devices are disclosed for producing a RTT vector (RTV) that is based upon the change in an airborne measuring station position and the corresponding RTT results taken at known time intervals to a ground based target station. In one embodiment, the target station is an access point or station conforming to the IEEE 802.11 standard and the airborne measuring station 110 may also be a device that conforms to the IEEE 802.11 standard. The disclosed method enables the location of a target station to an accuracy in the order of, for example, less than one half degree of bearing within, for example, a period in the order of 5 seconds.

18 Claims, 12 Drawing Sheets

(56) References Cited

U.S. PATENT DOCUMENTS

| | | | | |
|---|---|---|---|---|
| 2010/0007552 A1* | 1/2010 | Oda | ............... | G01S 19/48 |
| | | | | 342/357.43 |
| 2010/0286852 A1* | 11/2010 | Bouquet | ............. | G01S 19/51 |
| | | | | 701/17 |
| 2013/0023282 A1* | 1/2013 | Lin | ............... | G01S 5/021 |
| | | | | 455/456.1 |
| 2013/0054138 A1* | 2/2013 | Clark | ............. | G01C 21/203 |
| | | | | 701/468 |
| 2014/0210663 A1* | 7/2014 | Metzler | ............ | G01C 15/00 |
| | | | | 342/357.34 |
| 2014/0218240 A1* | 8/2014 | Kpodzo | ............ | G01S 5/0215 |
| | | | | 342/450 |
| 2014/0225771 A1* | 8/2014 | Phuyal | ............ | G01S 17/86 |
| | | | | 342/357.28 |
| 2014/0327581 A1* | 11/2014 | Murphy | ............ | G01S 19/215 |
| | | | | 342/417 |
| 2018/0017660 A1* | 1/2018 | Roquel | ............ | G01S 5/0072 |

OTHER PUBLICATIONS

Geodesy, "Do you know where you are?—The Global Positioning System" (Year: 2017).*

Soler, "Determination of Look Angles to Geostationary Communication Satellites" (Year: 1994).*

\* cited by examiner

FIG. 8

N = 50 RTTs per second, T = 5 seconds, Va = 120mph

| θt | 90 | 85 | 80 | 75 | 70 | 65 | 60 | 55 | 50 | 45 | 40 | 35 | 30 | 25 | 20 | 15 | 10 | 5 |
|---|---|---|---|---|---|---|---|---|---|---|---|---|---|---|---|---|---|---|
| $\sigma_\theta$, (1000ns accuracy) degrees | 2.1 | 2.1 | 2.1 | 2.1 | 2.2 | 2.3 | 2.4 | 2.5 | 2.7 | 2.9 | 3.2 | 3.6 | 4.1 | 4.9 | 6.0 | 8.0 | 11.9 | 23.6 |
| $\sigma_\theta$, (125ns accuracy) degrees | 0.3 | 0.3 | 0.3 | 0.3 | 0.3 | 0.3 | 0.3 | 0.3 | 0.3 | 0.4 | 0.4 | 0.4 | 0.5 | 0.6 | 0.8 | 1.0 | 1.5 | 3.0 |

*FIG. 10*

T= 5 seconds, Va = 120mph

| Orbit Radius miles | 1 | 1.5 | 2 | 2.5 | 3 | 3.5 | 4 | 4.5 | 5 |
|---|---|---|---|---|---|---|---|---|---|
| Angular error, $\theta_o$ degrees | 0.60 | 0.40 | 0.30 | 0.24 | 0.20 | 0.17 | 0.15 | 0.13 | 0.12 |

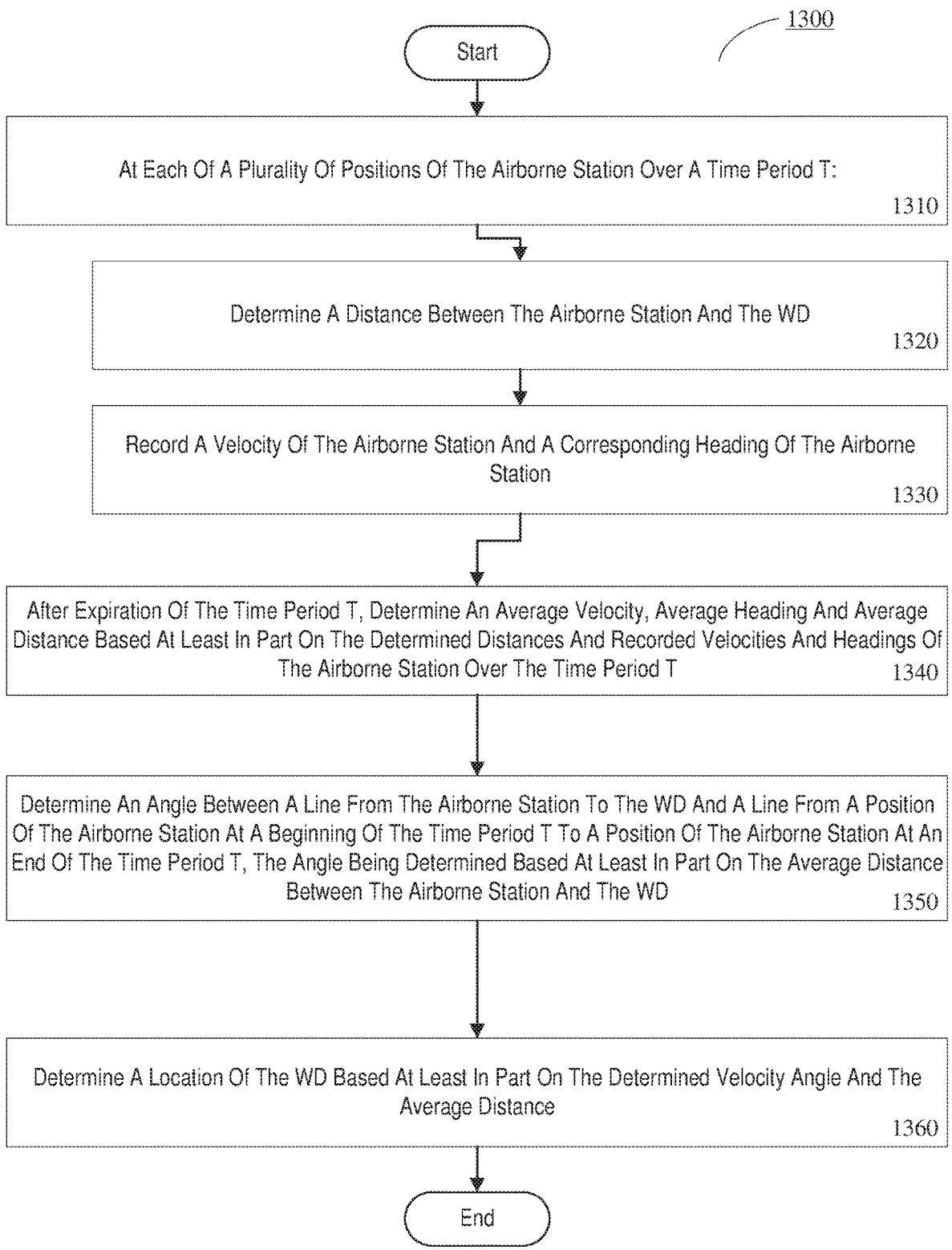

LOCATION USING ROUND TRIP TIME VECTORS USING AN AIRBORNE PLATFORM

CROSS REFERENCE TO RELATED APPLICATION

This Application is related to and claims priority to U.S. Provisional Application No. 62/771,430, filed Nov. 26, 2018, entitled LOCATION USING ROUND TRIP TIME VECTORS USING AN AIRBORNE PLATFORM, the entire contents of which is incorporated herein by reference.

TECHNICAL FIELD

The present disclosure relates geo-location of wireless devices and in particular to a method and system for the geo-location of wireless local area network (WLAN) devices.

BACKGROUND

Initially, it is noted that IEEE Standard 802.11-2016 is used as the base reference for disclosures used in this disclosure, the entire contents of which are incorporated herein by reference. The IEEE 802.11 Standard is commonly referred to as "Wi-Fi".

The location of wireless devices can be determined by various methods. These methods may be classified as active, passive and combined active and passive. In an active location scheme, a device that is determining the location or range, the measuring device transmits certain packets to the device being located, the target device, and the common method is to measure the time of arrival (TOA) of the response from the target device and compare that to the time of departure (TOD) of the packet transmitted by the measuring device so as to determine the time for the round trip, RTT.

In such location systems it is common to use multiple measuring devices to determine the location. In such a scheme simultaneous TOA and/or TOD measurements are taken by different measuring devices situated at different points and the location of the target device calculated based on measurements.

In an active location scheme, TOD may be measured for a packet that is transmitted from the measuring station (device) addressed to the target station (device). The TOA of the response from the target station at the measuring station is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS) which is a preset value. Hence, the time delay, td, between the measuring station and the target station may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known in the art.

FIG. 1 is a diagram of a typical location system 100 which includes three measuring stations 10a, 10b and 10c (referred to collectively herein as "measuring stations" or "measuring receivers"). The target station 120 is a wireless device, for example an Access Point (AP) that is to be located by the three measuring stations 10. The distance of the target station 120 from measuring station 10a is D1, 130. The distance of the target station 120, e.g. access point (AP) from measuring station 10b is D2, 140. The distance of the target station 120 from measuring station 10c is D3, 150. The round trip time, RTT1, determined from the calculation RTT=(TOA-TOD-SIFS), is measured for transmissions from measuring station 10a and this can used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1, 130, D2 140 and D3 150 are well known in the art.

In the case that there is a single measuring station 10, as may be the case when the station is airborne, then the three measuring distances D1 130, D2 140 and D3 150 may be taken at different points in time. An amount of time is required in order for the measuring station 10 to travel to the positions represented by 10a, 10b and 10c as shown in FIG. 1, so as to ensure angular intersections greater than 90 degrees which would result in an acceptable geometrical dilution of precision GDOP. Over time the location of target station 120 can be calculated with increasing accuracy as more measurements are taken by the measuring station 10 from varying positions. Such calculations are well known in the art, but there is a significant time delay before meaningful locations may result.

If, in order to obtain a faster location result, a directional antenna is utilized at that measuring station 10, then a direction may be known in addition to the distance to the target calculated from the RTT. FIG. 2 is a diagram of a measuring station 10 that is transmitting a ranging signal to a target station 120. The range 210 of the target station 120 from the measuring station 10, D 210, may be estimated from the RTT. If a directional antenna is deployed at the measuring station 10 then the angle, Φ220, of the direction of the received signal from the target station 120 can be measured. The location of the target station 120 can then be estimated as being a distance of D 210 from the measuring station 10 along a vector that is at an angle of Φ 220 relative to the measuring station. The accuracy of the estimated location will be dependent upon the directivity of the antenna at the measuring station 10, and the accuracy of the RTT measurement.

The directivity of an antenna increases with the size and gain of the antenna. For example, an antenna with 5 degree beamwidth at 2.4 GHz may have dimensions in the order of 1.6 meters or 5.3 feet. Even with such a directivity, if the measuring station 10 is airborne at an altitude of 10,000 feet and at a ground distance of 3 miles, then the ground location accuracy, based solely upon the antenna angle, of such a vector based location, as described in FIG. 2, would be about ±1400 feet.

In order to measure an accurate location of the target station 120 from an airborne measuring station 10 within a time period of seconds, then the use of a directional antenna requires an antenna of large dimensions which may be impractical for mounting on the airborne platform. In addition, a directional antenna may need to be controlled in elevation and azimuth so as to point in the direction of the target station 120 resulting in complex circuitry and/or a gimballed antenna assembly, which also may be impractical for mounting on the airborne platform.

SUMMARY

Some embodiments advantageously provide methods and airborne stations for the geo-location of wireless local area network (WLAN) devices. According to one aspect, a method for an airborne station for determining a location of a ground-based wireless device (WD) is provided. The method includes: at each of a plurality of positions of the airborne station over a time period T and determining a distance between the airborne station and the WD. The method also includes recording a velocity of the airborne station and a corresponding heading of the airborne station. After expiration of the time period T, an average velocity and average heading of the airborne station and an average distance between the airborne station and the WD are determined based at least in part on the determined distances and recorded velocities and headings of the airborne station over the time period T. The method also includes determining an angle between a line from the airborne station to the WD and a line from a position of the airborne station at a beginning of the time period T to a position of the airborne station at an end of the time period T, the angle being determined based at least in part on the average distance between the airborne station and the WD. The method also includes determining a location of the WD based at least in part on the determined angle and the average distance.

According to this aspect, in some embodiments, the determined angle further depends on a distance between two positions along a heading of the airborne station. In some embodiments, the two positions are the position of the airborne station at the beginning of the time period T to a position of the airborne station at the end of the time period T. In some embodiments, the determined angle is θt which is obtained from:

$$c\cos\theta t = -\frac{D_{AB}}{2D_B} - \frac{D_B}{2D_{AB}} + \frac{D_A^2}{2D_B D_{AB}}$$

where $D_A$ is a distance between the airborne station and the WD at the beginning of the time period T, $D_B$ is a distance between the airborne station and the WD at the end of the time period T, and $D_{AB}$ the distance between the positions of the airborne station at the beginning and end of the time period T. In some embodiments, the determined angle is corrected for an orbit radius of the airborne station. In some embodiments, the time period T is chosen based at least in part on a radius of curvature of a path of travel by the airborne station. In some embodiments, the time period T is chosen based at least in part on a recorded velocity of the airborne station. In some embodiments, a change in location of the WD is determined by averaging the velocities and corresponding headings.

According to another aspect, an airborne station for determining a location of a ground-based wireless device (WD) is provided. The airborne station includes processing circuitry configured to, at each of a plurality of positions of the airborne station over a time period T: determine a distance between the airborne station and the WD and recording a velocity of the airborne station and a corresponding heading of the airborne station. The processing circuitry is also configured to, after expiration of the time period T, determine an average velocity and average heading of the airborne station and an average distance between the airborne station and the WD, based at least in part on the determined distances and recorded velocities and headings of the airborne station over the time period T. The processing circuitry is further configured to determine an angle between a line from the airborne station to the WD and a line from a position of the airborne station at a beginning of the time period T to a position of the airborne station at an end of the time period T, the angle being determined based at least in part on the average distance between the airborne station and the WD, determine a location of the WD based at least in part on the determined angle and the average distance.

According to this aspect, in some embodiments, the determined angle further depends on a distance between two positions along a heading of the airborne station. In some embodiments, the two positions are the position of the airborne station at the beginning of the time period T to a position of the airborne station at the end of the time period T. In some embodiments, the determined angle is θt which is obtained from:

$$\cos\theta t = -\frac{D_{AB}}{2D_B} - \frac{D_B}{2D_{AB}} + \frac{D_A^2}{2D_B D_{AB}}$$

where $D_A$ is a distance between the airborne station and the WD at the beginning of the time period T, $D_B$ is a distance between the airborne station and the WD at the end of the time period T, and $D_{AB}$ the distance between the positions of the airborne station at the beginning and end of the time period T. In some embodiments, the determined angle is corrected for an orbit radius of the airborne station. In some embodiments, the time period T is chosen based at least in part on a radius of curvature of a path of travel by the airborne station. In some embodiments, the time period T is chosen based at least in part on a recorded velocity of the airborne station. In some embodiments, the processing circuitry is further configured to determine a change in location of the WD by averaging the velocities and corresponding headings.

According to yet another aspect, an airborne station configured to determine a location of a ground-based wireless device (WD) is provided. The airborne station includes processing circuitry configured to: determine a distance between the airborne station and the WD at a start time $t_a$ to produce distance $D_A$ and at an end time $t_b$ to produce the distance $D_B$. The processing circuitry is also configured to determine a distance $D_{AB}$ between a position of the airborne station at start time $t_z$ and at end time $t_a$; determine an angle θt from the following relationship:

$$\cos\theta t = -\frac{D_{AB}}{2D_B} - \frac{D_B}{2D_{AB}} + \frac{D_A^2}{2D_B D_{AB}}$$

and determine a location of the WD based at least in part on the determined angle and the distance $D_B$. According to this aspect, in some embodiments, the determined angle is corrected for an orbit radius of the airborne station.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 8 is a tabular representation of the results of the angular error $d\theta_t$ versus the angle $\theta t$;

FIG. 10 is an example table of the angular error $\delta\theta o$ for various orbit radii for values of T=5 seconds and airborne measuring station velocity Va of 120 mph;

FIG. 13 is a flow diagram of a process in an airborne station for determining the location of a ground-based wireless device.

DETAILED DESCRIPTION

Although this disclosure uses Wi-Fi as an example for the measurement of the round trip time (RTT), it should be clear to someone moderately skilled in the art that the RTT measurement processes described herein can be measured for other wireless technologies.

In one embodiment of the present disclosure, a single airborne measuring station is used. A method and devices are disclosed that locate the target station to an accuracy in the order of one half degree of bearing, in some embodiments, within a period in the order of 5 seconds. A method and devices are disclosed for producing a differential RTT vector (RTV) that is based upon the relative velocities referenced to the changes in position of the airborne measuring station position and the corresponding RTT results measured at known time intervals. In one embodiment, the target station is an access point or station conforming to the IEEE 802.11 standard and the airborne measuring station may also be a device that conforms to the IEEE 802.11 standard.

Figure 3:
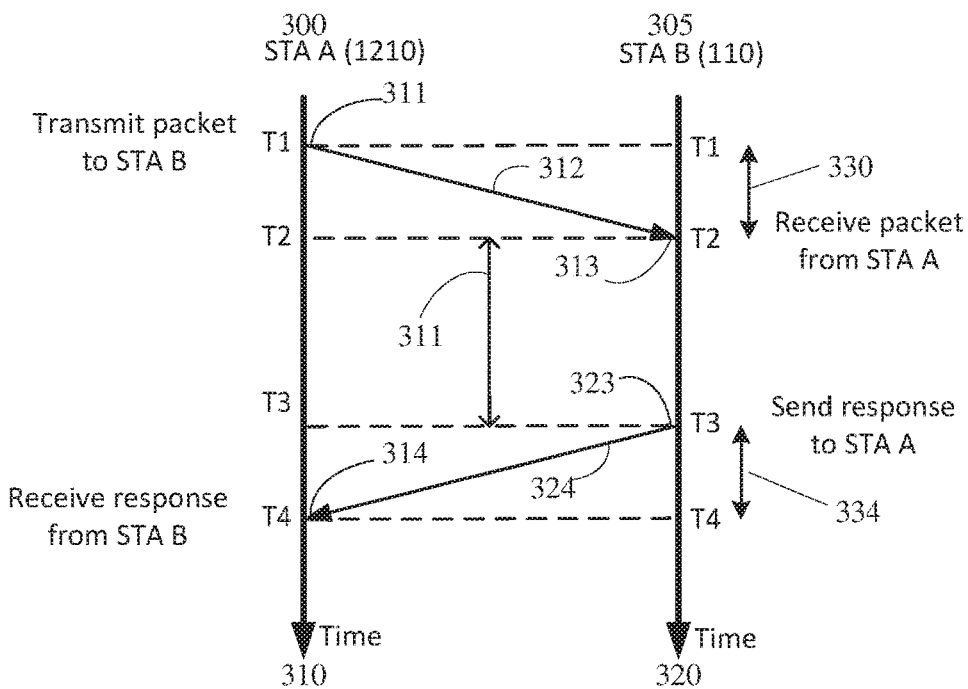
FIG. 3 is a timing diagram showing a ranging method of the present disclosure that may be used to determine the distance between the two wireless devices.

Returning now to the drawing figures, FIG. 3 is a timing diagram that describes a ranging method of the present disclosure that may be used to determine the distance between two wireless devices, for example wireless device STA A 300 and wireless device STA B 305. In one embodiment, one of the wireless devices (i.e., one of STA A 300 and STA B 305) may be a target station such as target station 120. In another embodiment, at least one of wireless devices (i.e., at least one of STA A 300 and STA B 305) is a measuring station such as measuring station 110. In some embodiments, the measuring station 110 may be a measuring station 10 modified in accordance with the disclosure made herein. Time axis 310 refers to the time axis for STA A 300 and time axis 320 refers to the time axis for STA B 305. At time T1 211, STA A 300 transmits a packet 312 to STA B 305. This transmission packet 312 is received at STA B 305 at time T2 313. The propagation time of the transmission packet 312 is thus (T2−T1) 330. STA B 305 transmits a response packet 324 at time T3 323. The time 311 that has elapsed between the reception of the packet at time T2 313 and the transmission at time T3 323 is the turnaround time 311 at STA B 305. The turnaround time 311 at STAB, as specified in IEEE 802.11-2016, will be equal in duration to SIFS. At time T4 314, STA A 300 receives the response 324 from STA B 305. The propagation time of the transmission packet 324 is (T4−T3) 334. It should be noted that the time differences 330 (T2-T1) and 334 (T4−T3) represent the propagation time, td, of the transmissions and should be equal assuming the distance between the two stations has not changed. The total time that elapses between the transmission packet 312 and the response packet 324 at STA A 300 is $$(T2-T1)+(T3-T2)+(T4-T3)=(T4-T1)=td+\text{SIFS}+td \quad (1)$$

$$\text{Hence, } td=(T4-T1-\text{SIFS})/2 \quad (2)$$

Expression (2) is a simplified equation that is provided so as to explain the basic idea of the ranging transmission method. Note that the duration of the transmitted packet and the response packet is not accounted for in equation (2). Note, however, that in practice it is common that the timestamp of a packet is set to coincide with the end of the packet at the point where the frame check is completed.

Figure 4:
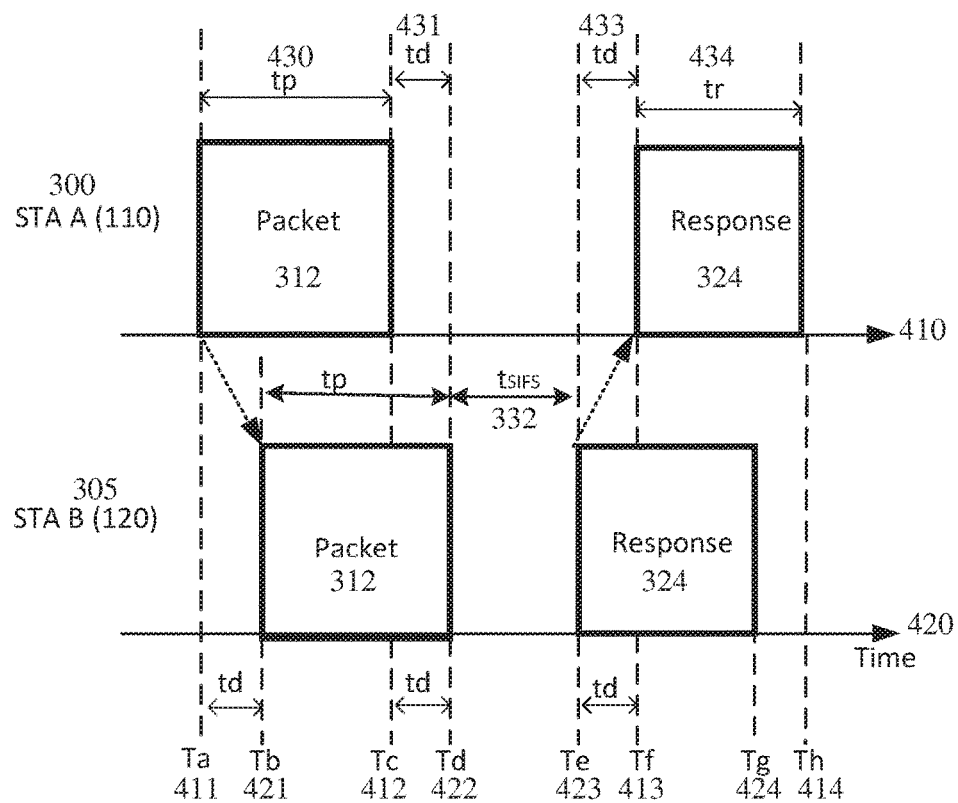
FIG. 4 is a timing diagram that describes in further detail the ranging method of FIG. 3.

FIG. 4 is a timing diagram that describes in further detail the ranging transmission method of FIG. 3. Time axis 410 is the time axis for STA A 300 and time axis 420 is the time axis for STA B 305. At time Ta 411, STA A 300 starts the transmission of packet 312 which is addressed to STA B 305. After a time delay of td, at time Tb 421, STA B 305 starts to receive packet 312. At time Tc 412, STA A 300 completes the transmission of packet 312 and at time Td 422, STA B 305 completes the reception of packet 312. The time difference between Tc 412 and Td 422 is td, the propagation time for the packet to travel from STA A 300 to STA B 305. Note that the time differences (Tc−Ta) and (Td−Tb) are both the duration tp 430 of the transmitted packet 312.

STA B 305 transmits the response packet 324 at time Te 423. Assuming that the response is an ACK or an RTS packet in reply to the received packet 312, time Te 423 ideally will be at a time $t_{SIFS}$ 332 after time td 422, where $t_{SIFS}$ 332 is the SIFS time as defined in the IEEE 802.11-2016 standard. At time Tf 413, STA A 300 starts to receive the response 324. At time Tg 424, STA B 305 completes the transmission of the response 324 and at time Th 414, STA A 300 completes receiving the response 324. Note that the time differences (Tb−Ta), (Td−Tc), (Tf−Te) and (Th−Tg) are all equal and have the value td which is the propagation time for the packet and response to travel between the two STAs 300 and 305.

At STA A 300, the time of a packet at the point when the frame check has completed, may be recorded. Hence, if STA A 300, is the measuring station, the time for the transmission of packet 312 that is recorded is Tc 412, and the time that is recorded for the reception of the response 324 is Th 414. In order to calculate the value of td, it may be necessary to know the duration tr 434 of the response 324. Calculating the duration tr 434 may be straightforward as the measuring station STA A 300 can monitor the details of the response packet such as data rate and length. In practice therefore, STA A 300 can calculate the value of td from expression (3):

$$td=(Th-Td-tr-t_{SIFS})/2 \qquad (3)$$

and hence the corresponding distance, $D=td*c$ (4)

Stated another way, STA A 300 begins transmission of ranging packet 312 at a beginning transmission time Ta 411 and ends transmission of the ranging packet 312 at an ending transmission time Tc 412. STA B 305 begins receiving of the first ranging packet 312 at a beginning reception time Tb 421 and receives the complete first ranging packet 312 at an ending reception time Td 422, where Td 422 is measured as the time between the ending transmission time Tc 412 and the ending reception time Td 422.

In the case that there is a single measuring station 110, as may be the case when the station is airborne, then the three measuring distances D1 130, D2 140 and D3 150 may be taken at different points in time. In this case the airborne measuring station 110 may be flying over an area and periodically transmitting the packets 312, receiving the response packets 324 and calculating the delay time td. Over time the location of the target station 120 can be calculated with increasing accuracy as more measurements are taken by the measuring station 110 from varying positions. Such calculations are known.

As mentioned previously, the packet exchange may be any pair of packets where an automatic response packet is sent. Commonly used Wi-Fi packets include an RTS/CTS exchange and a Data (null)/Ack exchange.

Figure 1:
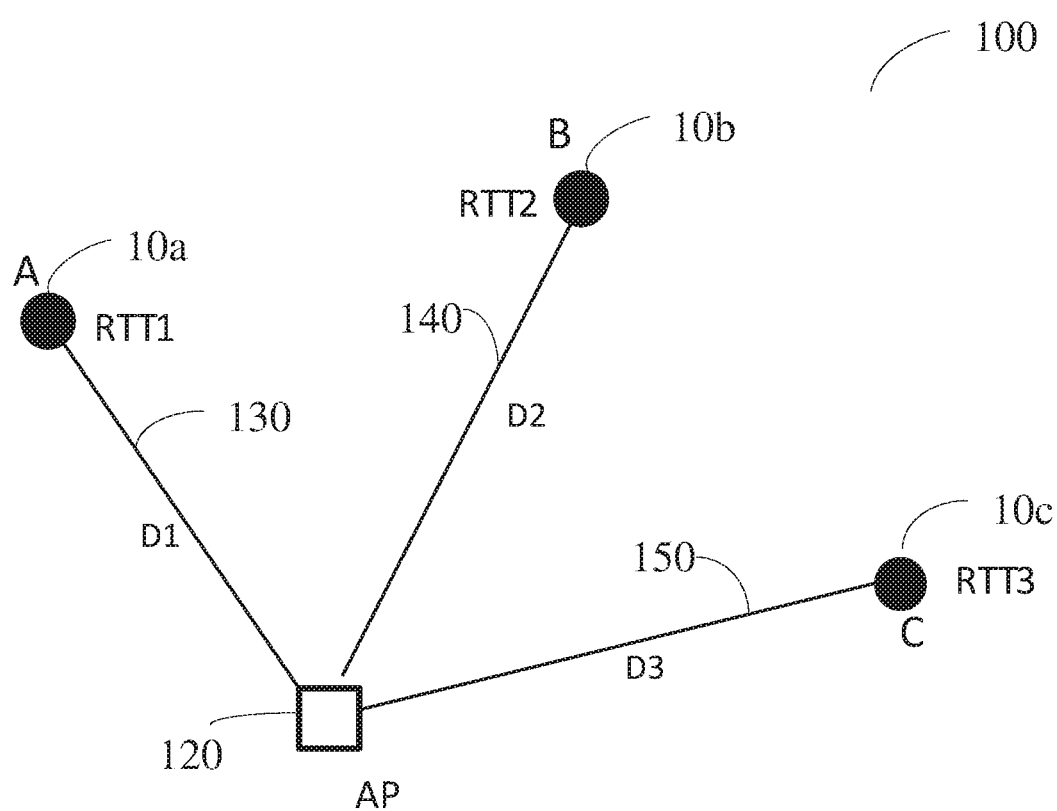
FIG. 1 is a diagram of a typical location system which includes three measuring stations.
Figure 2:
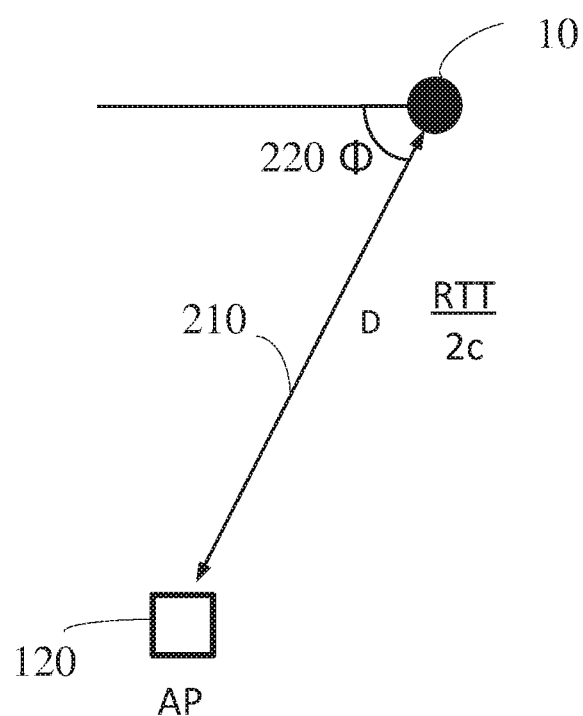
FIG. 2 is a diagram depicting a measuring station that is transmitting a ranging signal to a target station.
Figure 5:
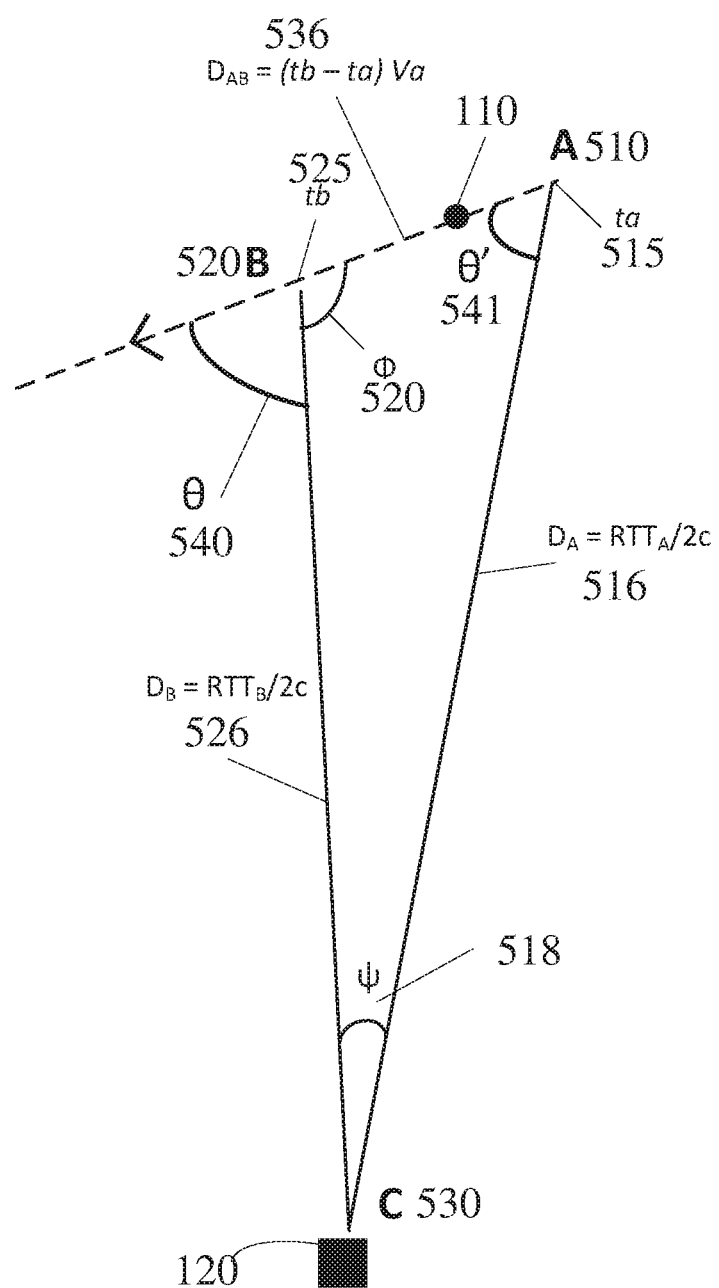
FIG. 5 is a diagram depicting an example of one embodiment of the disclosure using RTVs based upon velocity vectors.

FIG. 5 is a diagram of an example of one location determination, i.e., target position determination, embodiment of the disclosure using RTVs based upon the change in position of the measuring station 110 relative to the target station 120. The airborne measuring station 110 is mounted in an airborne platform and will be henceforth referred to as the airborne measuring station 110 or more simply as the airborne station 110. At time ta 515, airborne measuring station 110 is at position A 510. At time tb 525, airborne measuring station 110 is at position B 520. At time ta 515, airborne measuring station 110 transmits to the target station 120 and measures the RTT as described above with reference to FIGS. 2 and 3. The distance $D_A$ 516 to target station 120 from point A 510, at time ta is equal to the value $RTT_A/2c$. At time tb 525, airborne measuring station 110 transmits to the target station 120 and again measures the RTT as described above with reference to FIGS. 2 and 3. The distance $D_B$ 526 to target station 120 from point B 520, at time tb is $RTT_B/2c$. At point A 510, the airborne measuring station 110 is moving in the direction AB at an angle of θ' 541 relative to the direction of the vector from point A 510 and the location of the target station 120 at point C 530. At points A 510 and B 520, the airborne measuring station 110 is travelling at a velocity Va. At point B 520, the airborne measuring station 110 is travelling at an angle of θ 540 relative to the direction of the vector from point B 520 and the location of the target station 120. The position, velocity and heading of the airborne measuring station 110 may be derived directly from the GPS inputs to the aircraft electronics. The distance $D_{AB}$ 536 can be derived either directly from the GPS position inputs to the aircraft electronics or by the formula $D_{AB}=(t_b-t_a)$ Va.

Applying the cosine rule to the triangle ABC $$D_A^2=D_B^2+D_{AB}^2-2D_BD_{AB}\cos(\emptyset) \qquad (5)$$

where $\emptyset=\pi-\theta$
Re-arranging $$\cos(\phi) = \frac{D_{AB}^2 + D_B^2 - D_A^2}{2D_{AB}D_B} \qquad (6)$$

Or (7)

$$\cos(\phi) = \frac{D_{AB}}{2D_B} + \frac{D_B}{2D_{AB}} - \frac{D_A^2}{2D_BD_{AB}}$$

Therefore, the angle θ 560 may be calculated.

$$\theta=\pi-\emptyset \qquad (8)$$

The estimated location of the target station 120 is therefore at a distance of $D_B$ 526 at an angle of θ 560 relative to the heading of the airborne measuring station 110.

The measuring points, A 510 and B 520, should be such that the path of the airborne measuring station 110 may be assumed to be in a straight line. It is understood to those skilled in the art that this requirement will depend upon the time difference $(t_b-t_a)$, the distances $D_A$ and $D_B$, and the velocity Va of the airborne measuring station 110.

Figure 6:
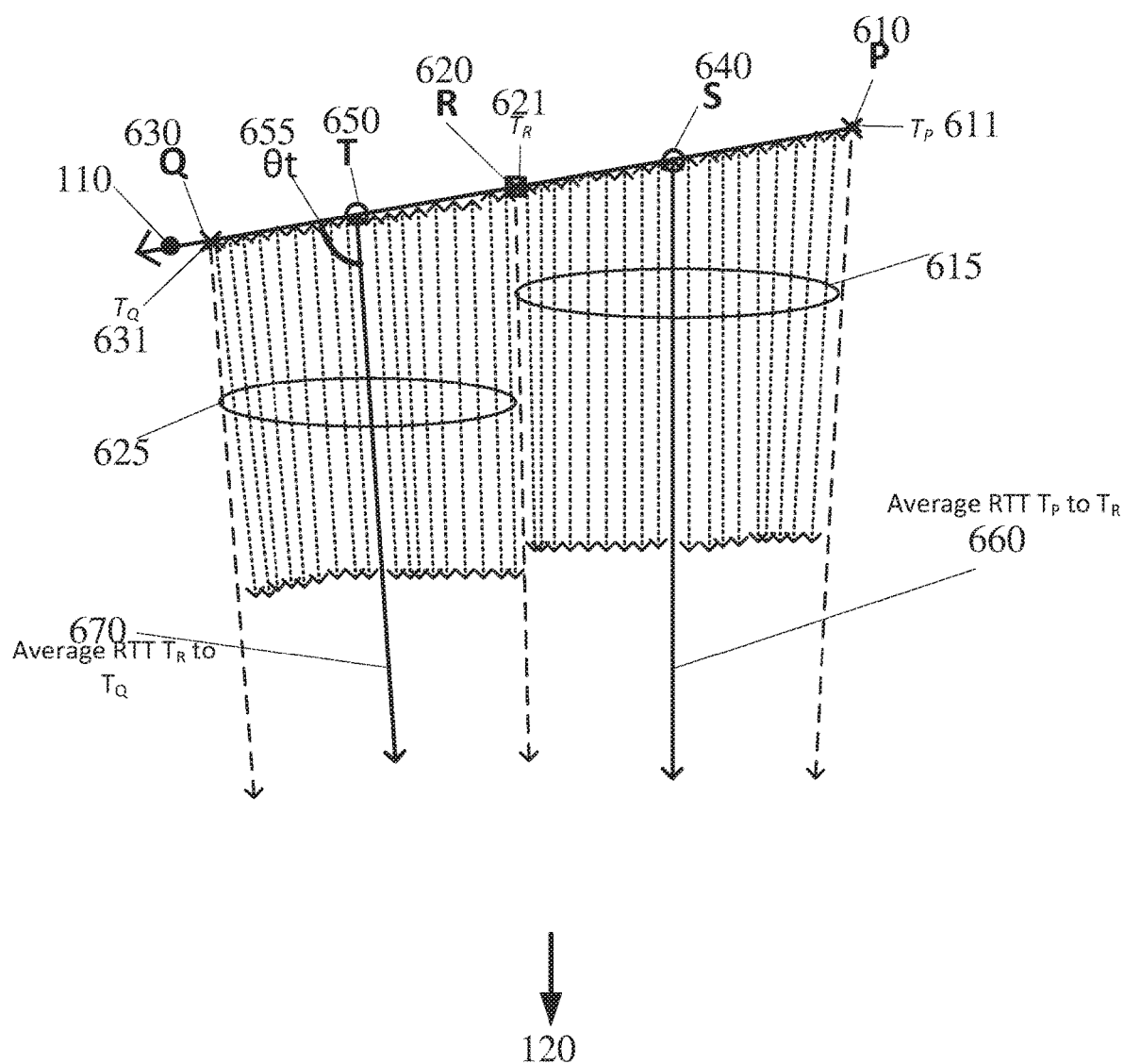
FIG. 6 is a diagram depicting another example of one embodiment of the disclosure using RTT vectors (RTVs) based upon velocity vectors.

FIG. 6 is a diagram depicting an example of another embodiment of the disclosure using RTVs based upon relative change of positions. Airborne measuring receiver 110 travels in a nominal straight line starting from location P 610 to location Q 630 via locations S 640, R 620 and T 650. The airborne measuring station 110 transmits to the target station 120 and measures the RTT as described above with reference to FIGS. 2 and 3 at regular periods throughout the time taken to travel between points P 610 and Q 630. Between the time $T_P$ 611, the time that the airborne measuring station 110 is at location P 610, and the time $T_R$ 621, the time that the airborne measuring station 110 is at location R 620, the airborne measuring station 110 measures a number of RTT's 615 to the target station 120. Similarly, between the time $T_R$ 621, the time that the airborne measuring station 110 is at location R 620, and the time $T_Q$ 631, the time that the airborne measuring station 110 is at location Q 730, the airborne measuring station 110 measures a number of RTT's 625 to the target station 120. At time $T_R$ 621, the airborne measuring station 110 calculates the average, RTTs 660, measured over the time $T_R-T_P$. At time $T_Q$ 631, the airborne measuring station 110 calculates the average, RTTt 670, measured over the time $(T_Q-T_R)$ and uses the value of (RTTt−RTTs) to calculate the value of the velocity vector Vt in the direction of the target station 120, as described in equations (1) and (3). This value of Vt, together with the value for the velocity and heading of the airborne measuring station 110, is then used to calculate the angle θt 655, the direction to the target station 120 relative to the heading of the airborne measuring station 110, as described above in equation (7), relative to the location T 650. The value for the distance traveled by the airborne measuring station 110 may be calculated either by using the averages of the velocity over the period $T_Q-T_P$, or by direct position inputs from another source such as a GPS receiver, or indeed variations on these. The choice as to which heading and velocity for the value for the velocity and heading of the airborne measuring station 110 to use may be influenced by the change in heading of the airborne measuring station 110 over the period of $T_Q-T_P$. In general, it may be preferable to use the average heading and velocity over this period to account for any curvature in the airborne path.

Assuming that $(T_Q-T_R)=(T_R-T_P)=T$, and the airborne measuring station 110 continues to geo-locate the target station 120, the direction and distance of the target station 120 from the airborne measuring station 110 would be updated every time period T. In practice the airborne measuring station 110 may be orbiting the target station 120 and hence the path PRQ may be a curve. However, as long as the time T is short, the path of the airborne measuring station 110 may be assumed to be linear over that time period T.

Figure 7:
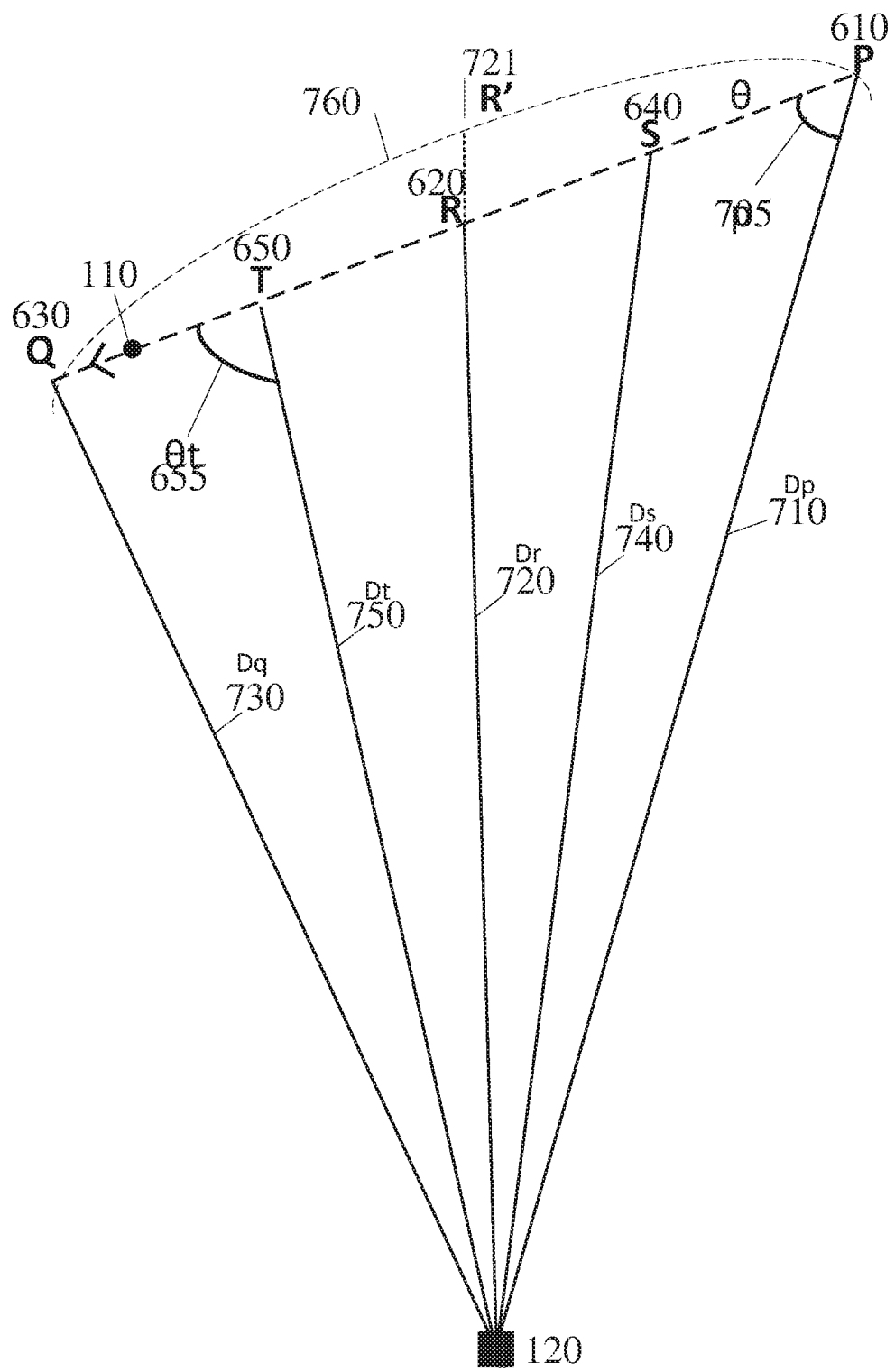
FIG. 7 is a diagram depicting an example of another embodiment of the disclosure using RTVs based upon the RTT vectors as described in FIG. 6.

FIG. 7 is a diagram depicting the example of an embodiment of the disclosure using RTVs based upon the RTT vectors as described above with reference to FIG. 6. The airborne measuring station 110 starts at location P 610 and then moves via points S 640, R 620, and T 650 to point Q 630. As described above with reference to FIG. 6 the RTT to the target station 120 may be measured at regular periods throughout. The time to travel between points P 610 and R 620, and between points R 620 and Q 630 is T seconds. The time to travel between points P 610 and S 640, and between points S 640 and R 620 and between points R 620 and T 650, and between points T 650 and Q 630 airborne measuring station 110 is T/2 seconds. The distances to target station 120 from points P 610, S 640, R 620, T 650, and Q 630 are Dp 710, Ds 740, Dr 720, Dt 750, and Dq 730 respectively.

The velocity of the airborne measuring station 110 is Va and the angle subtended by the direction of the airborne measuring receiver 110 and the vector to the target station 120 is θp 805. The distance between points P 710 and R 720, and between points R 720 and Q730 is T Va.

Assuming that there are no RTT measurement errors, then:

$$Ds=(Dp+Dr)/2 \quad (9)$$

$$\text{And } Dt=(Dr+Dq)/2 \quad (10)$$

$$\text{At point } T\ 650\ Vt=(Ds-Dt)/T \quad (11)$$

From (7)

$$\cos\theta t = -\frac{D_{AB}}{2D_B} - \frac{D_B}{2D_{AB}} + \frac{D_A^2}{2D_B D_{AB}} \quad (12)$$

An analysis of the potential errors associated with this RTV method are now examined.

Assume that in the period T, the airborne measuring station 110 transmits and receives N ranging packets as described above with reference to FIGS. 2 and 3. Let the RTT measurement error by the airborne measuring station 110 be Δ. The average error is Δ/2. If N packets are successfully received at the airborne measuring station 110 over the time period T, then the error in the averaged RTT measurement is reduced by a factor of √N. Hence the standard deviation $\sigma_t$ in the measured values for Ds and Dt is $$\sigma_t = \pm \frac{\Delta}{2\sqrt{N}} \quad (13)$$

From (12)

$$\cos\theta t = -\frac{D_{AB}}{2D_B} - \frac{D_B}{2D_{AB}} + \frac{D_A^2}{2D_B D_{AB}}$$

Taking differentials:

$$\sin\theta_t \delta\theta_t = \frac{D_{AB}}{2D_B^2}\delta D_B - \frac{1}{2D_B}\delta D_{AB} - \frac{1}{2D_{AB}}\delta D_B +$$

$$\frac{D_B}{2D_{AB}^2}\delta D_{AB} - \frac{D_A^2}{2D_B^2 D_{AB}}\delta D_B - \frac{D_A^2}{2D_B D_{AB}^2}\delta D_{AB}$$

Assuming that $D_{AB} \ll D_A$ and $D_{AB} \ll D_B$ and $D_A \approx D_B$ $$\sin\theta_g \delta\theta_t \approx -\frac{1}{D_{AB}}\delta D_B \quad (14)$$

$$\text{Now for } \delta D_B = \pm\sigma_t \text{ and } \theta_t = \sigma_\theta \quad (15)$$

From (13), (14) and (15)

$$\sigma_\theta \approx \pm \frac{\Delta}{2D_{AB}\sqrt{N}\sin\theta_t} \quad (16)$$

$$\sigma_\theta \approx \pm \frac{\Delta}{2TV_a\sqrt{N}\sin\theta_t}$$

The standard deviation $\sigma_\theta$ of the angle $\theta_t$ can be calculated using equation (16).

Inspection of equation (16) reveals that the angular error $\sigma_\theta$ may be reduced if the time period T is increased as the number of packets received N increases. Also, if the velocity Va, 530 is increased then the angular error $\sigma_\theta$ is reduced.

Figure 9:
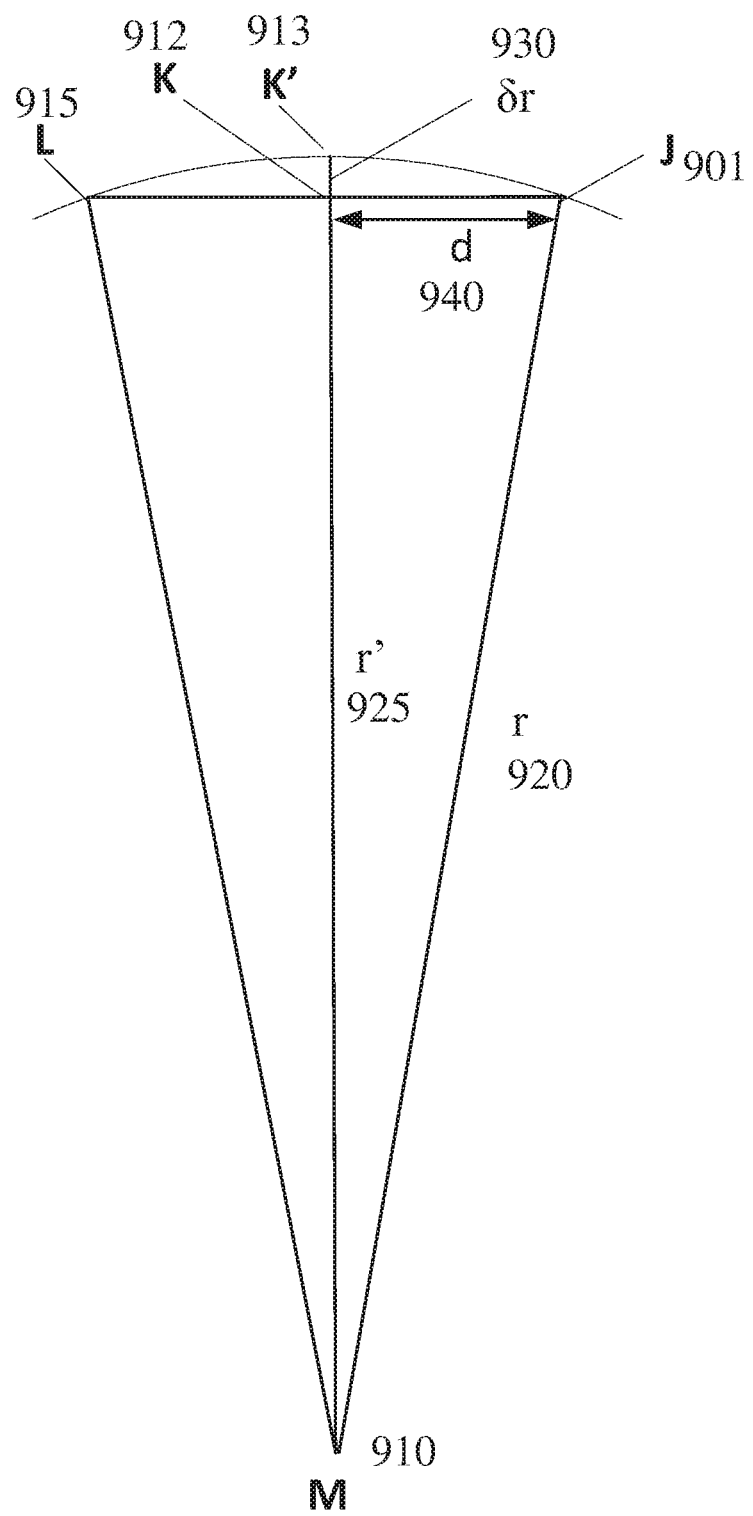
FIG. 9 is a diagram that may be used to estimate the RTT error due to the orbit radius.

Although the average distance of the target station 120 from the airborne measuring station 110 does not appear in equation (15) the radius of the orbit of the airborne measuring station 110 may affect the choice of the value for T as at a shorter orbit radius the assumption that the flight path of the airborne measuring station 110 is a straight line over the time period T may not be true if T is chosen to be too long, or indeed, if the velocity Va, 530 is too high. The curvature of the path of the airborne measuring station 110 might cause the measurements of the RTTs to be longer. In FIG. 7 the curvature of the orbit is shown as curve 760. If this was the true course of the airborne measuring station 110, then at time Tr 7621, the airborne measuring station 110 would be at point R' 721 whereas the assumption is that it is at point R 620. Hence there is a potential error due to the orbit of the airborne measuring station 110. The magnitude of this error due to the radius of the orbit is discussed and calculated below with reference to FIG. 9, and is shown to be negligible. Therefore, it reasonably may be assumed that the flight path of the airborne measuring station 110 is a straight line over the time period T.

Inspection of equation (16) also reveals that, the lower the RTT measurement error A, the better the angular accuracy. Using as an example, the case where the target station 120 and the airborne measuring station 110 are based upon IEEE 802.11 technology, Wi-Fi, the measurement of the RTT may be as described in FIGS. 2 and 3. The standard packet timing measurement accuracy of a Wi-Fi device is 1 μs, or 1000 nanoseconds (ns), i.e., Δ=1000 feet. Assuming that 50 ranging packets are exchanged every second, and that T=5 seconds, then the standard deviation $\sigma_t$ ($\Delta$=1000 feet) is $$\sigma_t(\Delta = 1000 \text{ feet}) = \frac{1000}{\sqrt{250}} = 63.2 \text{ feet}$$

A clock available in many Wi-Fi devices is at 40 MHz and if the timing measurement accuracy of the airborne measuring station is based upon the edges of this clock, then the timing accuracy can be improved to 125 ns, i.e. $\Delta$=125 feet. Assuming, again, that 50 standard deviations $\sigma_t$ ($\Delta$=125 feet) is $$\sigma_t(\Delta = 125 \text{ feet}) = \frac{125}{\sqrt{250}} = 7.9 \text{ feet}$$

FIG. 8 is a tabular representation of the example results of the angular error $\sigma_\theta$ versus the angle $\theta_t$ 655 as calculated using equation (15) for both $\Delta$=1000 feet and $\Delta$=125 feet, with N=50 per second, T=5 seconds and Va=120 mph. For $\Delta$=125 feet, the angular error $\sigma_\theta$ is in the order of 0.3 degrees for angle $\theta_t$ 655 values from 45 to 90 degrees. In practice, because the airborne measuring station 110 is orbiting the target station 120, it may be relatively simple to keep the angle $\theta_t$ 655 greater than 45 degrees. Note, however that using the standard Wi-Fi timing accuracy of $\Delta$=1000 feet, the angular error $\sigma_\theta$ is in the order of 2.5 degree as $\theta_t$ 655 varies from 45 to 90 degrees. In either case, it is understood that this accuracy, achieved by measuring timing differences, is comparable to the use of a directional antenna of large dimensions as described with reference to FIG. 4. These theoretical location accuracies are possible within a short period, for example on the order of 10 seconds, and then updated on the order of every 5 seconds.

As mentioned above, it is assumed that the airborne measuring station 110 travels in a straight line over the time period T. If the airborne measuring station 110 is flying in an orbit around the target station 120, then the curvature of the path of the airborne measuring station 110 might cause the measurements of the RTTs to be slightly longer than if the station 110 travels in a straight line over the time period T.

Estimation of the RTT error due to the orbit radius is explained with reference to FIG. 10. Points J 901, K' 913, and L 915 lie on the circumference of a circle centered at point M 910. The radius of the circle is r 920. The straight line joining points J 901, K 912, and L 915 is the chord connecting points J 901 and L 915. The length of the line joining points M 910 and K 912 is r' 925. The length of the line joining points K 912 and K' 913 is $\delta$ 930. The length of the line joining points J 901 and K 912 is d 740. The following analysis applies:

$$r^2 = r'^2 + d^2 \text{ and } \delta r = r - r'$$

Hence $\delta r = r - \sqrt{r^2 - d^2}$

Assuming that d<<r $$\delta r = r - r\left(1 - \frac{d^2}{r^2}\right)^{\frac{1}{2}}$$

Reducing to $$\delta r = \frac{d^2}{2r} \quad (17)$$

If point M 910 is the position of the target station 120, and the airborne measuring station 110 is travelling along the path J K' L, then 2d represents the distance travelled by the airborne measuring station 110 in time T. When the airborne measuring station is at point K' 913 the measured distance to the target station 120 at point M 910 would be r 920, but when applying equation (7), as described in FIG. 6, the assumption is that the airborne measuring station 110 is at point K 912. Hence the error in the distance measurement is $\delta$ 930. At points J 901 and L 915 there is no error, so to a first approximation the error due to the circular path of the orbit is $\delta r/2$.

Using the terms as per FIGS. 5 and 6 and equation (12), $d=D_{AB}/2$ and $r=D_t$.
Hence, equation (17) can be re-written as
From (14), for $\theta_t$=90 degrees $$\delta D_t = \frac{D_{AB}^2}{32 D_t} \quad (18)$$

$$\delta \theta_o \approx -\frac{1}{2 D_{AB}} \delta D_t$$

Where $\delta\theta_o$ is an approximation of the angular error due to the circular orbit of the airborne measuring station 110. Substitute (18)

$$\delta \theta_o \approx -\frac{D_{AB}}{64 D_t} \quad (19)$$

FIG. 10 is a table of examples of the angular error $\delta\theta o$ for various orbit radii for values of T=5 seconds and airborne measuring station 110 velocity Va of 120 mph as estimated using equation (19). Comparing the angular error $\delta\theta o$ to the angular error $\sigma_\theta$ in FIG. 8, $\delta\theta o$ is small if the measurement accuracy is 1000 ns, but it is of the same magnitude as $\sigma_\theta$ for orbits less than 3 miles. As the orbit radius increases the error $\delta\theta o$ decreases. It should be noted that in practice the radius of the orbit of the airborne measuring station 110 is known, therefore this error, $\delta\theta_o$, can be estimated using equation (19) and compensated for.

Figure 11:
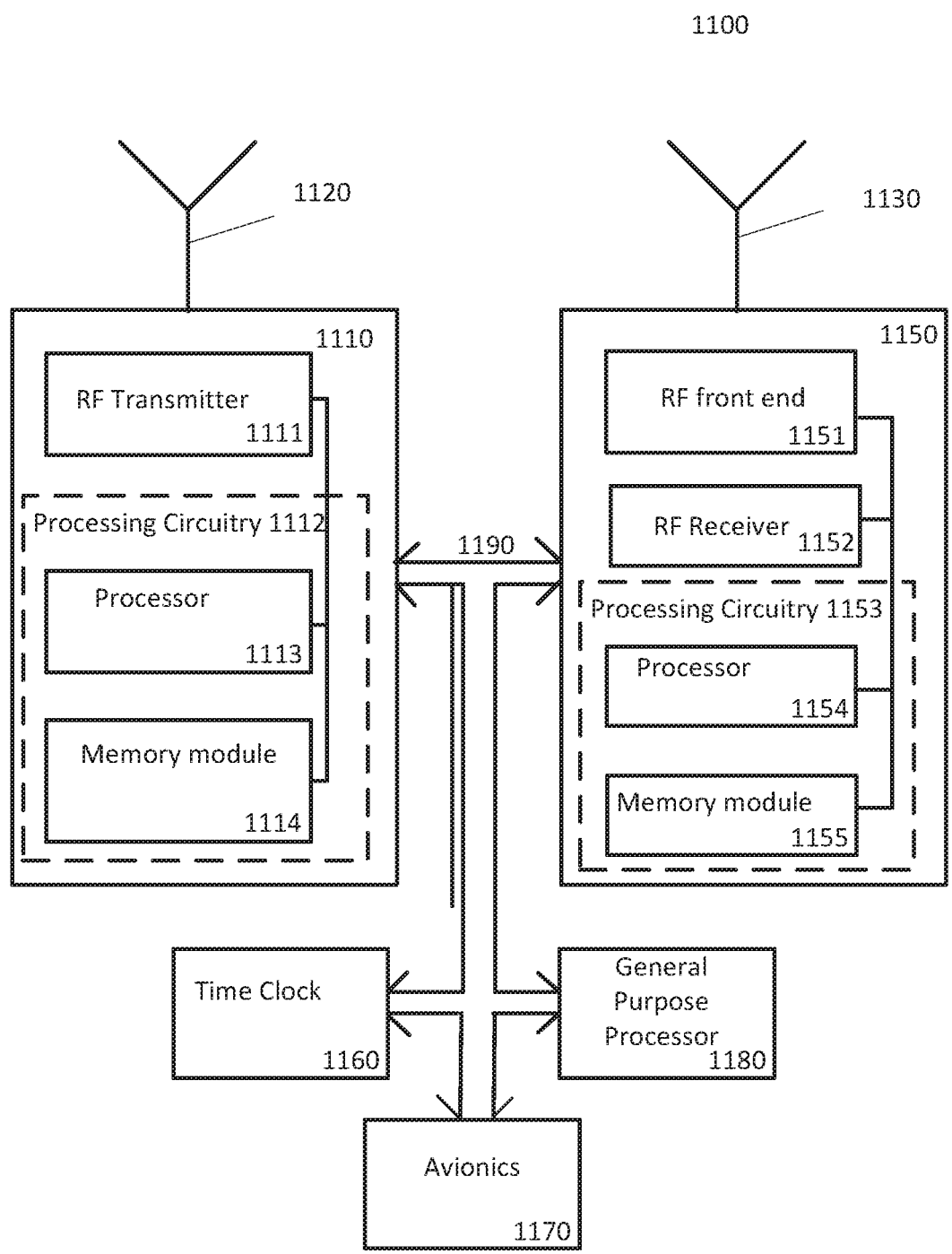
FIG. 11 illustrates a wireless communication device which according to an embodiment of the disclosure may be used as the airborne measuring station.

FIG. 11 illustrates a block diagram of an example wireless communication device 1100 which, according to an embodiment of the disclosure, may be used as or as part of the airborne measuring station 110 and configured to perform the functions described herein.

The wireless communication device 1100 may be any device configured to wirelessly receive signals and transmit signals, and may be configured to execute any of the methods of the IEEE 802.11-2016 Standard. Wireless communication device 1100 may be one or more stations or access points, and the like. Wireless communication device 1100 may be one or more wireless devices that are based upon the IEEE 802.11 specification and each may be configured to act as a transmitter or a receiver. The embodiment described herein is that where wireless measuring station 1100 includes a wireless transmitter 1110 and a wireless receiver 1150. The wireless measuring station 1100 may also include a time clock 1160 and a general purpose processor 1180 which are interconnected to the two stations wireless transmitter 1110 and wireless receiver 1150 by a data bus 1190.

In some embodiments, the wireless transmitter 1110 includes an RF transmitter 1111 and processing circuitry 1112 that includes processor 1113, and memory module 1114. The wireless transmitter 1110 also includes one or more wireless antennas such as wireless antennas 1120. The RF transmitter 1111 may perform the functions of spreading, encoding, interleaving and modulation, as described in IEEE 802.11-2106, and amplification for the transmission of the Wi-Fi packets via the antenna 1120. In some embodiments, the processing circuitry 1112 and/or the processor 1113 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the some or all of the functions of the RF transmitter 1111 may be performed by the processing circuitry 1112. The processing circuitry 1112 may be configured to control any of the methods and/or processes described herein and/or to cause such methods, and/or processes to be performed, e.g., by the wireless transmitter 1110. The memory module 1114 may be configured to store data, programmatic software code and/or other information described herein. In some embodiments, the software may include instructions that, when executed by the processing circuitry 1112, causes the processing circuitry 1112 to perform the processes described herein with respect to the wireless transmitter 1110.

In some embodiments, the wireless receiver 1150 includes an RF front end 1151, an RF receiver 1152, processing circuitry 1153 (that includes a processor 1154 and a memory module 1155) and one or more wireless antennas such as wireless antenna 1130. The RF front end 1151 may perform the usual functions of an RF receiver front end such as low noise amplification, filtering and frequency down conversion so as to condition the received signal suitable for inputting to the RF receiver 1152. The RF receiver 1152 may perform the functions of demodulation, decoding and de-spreading so as to condition the received signal suitable for inputting to the processing circuitry 1153. In some embodiments the RF receiver 1152 and/or the processing circuitry 1153 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF receiver 1152 may be performed by the processing circuitry 1153. The processing circuitry 1153 may be configured to control any of the methods and/or processes described herein and/or to cause such methods, and/or processes to be performed, e.g., by the wireless receiver 1150. The memory module 1155 is configured to store data, programmatic software code and/or other information described herein. In some embodiments, the software may include instructions that, when executed by the processing circuitry 1153, causes the processing circuitry 1153 to perform the processes described herein with respect to the wireless receiver 1150.

According to this embodiment of the disclosure the wireless receiver 1150 may be configured to measure and monitor an input signal's attribute, such as may include one or more of a ranging signal transmitted by wireless transmitter 1110, data and control packets, and the response signal, including control packets, transmitted by an access point or station that may be based upon the IEEE 802.11-2016 Standard. Such packets may include data null, ACK, RTS and CTS packets. The memory module 1155 may store instructions for executing any method mentioned in the IEEE 802.11-2016 Standard, input signals, and results of processing of the processor 1154 signals to be outputted and the like.

According to an embodiment of the disclosure the RF transmitter 1111 may be configured to transmit signals and the processing circuitry 1112 may be configured to prepare the transmitted signal attributes based upon the IEEE 802.11-2016 Standard. Such transmitted packets may include data packets, control packets and management packets that are to be transmitted by a wireless station that is based upon the IEEE 802.11-2016 Standard. Such control packets may include RTS packets. The memory module 1114 may store instructions for executing any method mentioned in the specification, input signals, and results of processing of the processor 1113, signals to be outputted and the like.

According to another embodiment of the disclosure, the wireless receiver 1150 may be configured to receive the transmissions of another wireless communication device such as another target station 120 and the processing circuitry 1153 may be configured to monitor an attribute of the transmissions of the other wireless communication device, and determine the value of the time of arrival of packets from the other wireless communication device. In addition, according to an embodiment of the disclosure the wireless receiver 1150 may be configured to measure the times of departure of the transmissions from the wireless transmitter 1110. These times may be accomplished by outputting a trigger that is timed to coincide with the reception packet from the other target station 120 or the wireless transmitter 1110. This trigger may then be used to read the time from the time clock 1160. Time clock 1160 may have a precision that is higher than the internal timing synchronization function (TSF) timer that is part of the wireless receiver 1150.

According to an embodiment of the disclosure the wireless transmitter 1110 may be configured to transmit packets to another wireless communication device and the processor 1112 may be configured to prepare the attributes of the packet to be transmitted.

According to an embodiment of the disclosure, a general purpose processor 1180 may be used to control the operations of the measuring device 1100 and in particular the wireless transmitter 1110 and wireless receiver 1150. The general purpose processor 1180 may also carry out the various calculations as described in this disclosure and may also prepare the measurement results for disclosure to an operator or user. In some embodiments, the general purpose processor 1180 can be a computing device such as a tablet computer, desktop computer, laptop computer, or distributed computing, e.g., cloud computing. In some embodiments, the general purpose processor 1180 can be a processor/CPU in the tablet, laptop computer, desktop computer, or distributed computing environment, etc. In some embodiments the general purpose processor 1180 may comprise integrated circuitry for processing and/or control, e.g. one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the measuring device 1100 can be included in a single physical device/housing or can be distributed among several different physical devices/housings. Processor 1180 may be used to perform the various calculations as described in this disclosure and may also prepare the measurement results for disclosure to an operator or user.

According to an embodiment of the disclosure, an avionics circuit 1170 may be used to input, via the data bus 1190, to the general purpose processor 1180 and/or the processing circuitry 1153 the position, velocity and heading of the airborne platform that is carrying the wireless communication device 1100 which, according to an embodiment of the disclosure, may be used as or as part of the airborne measuring station 110. The avionics circuit 1170 may comprise navigation equipment such as a GPS receiver.

Figure 12:
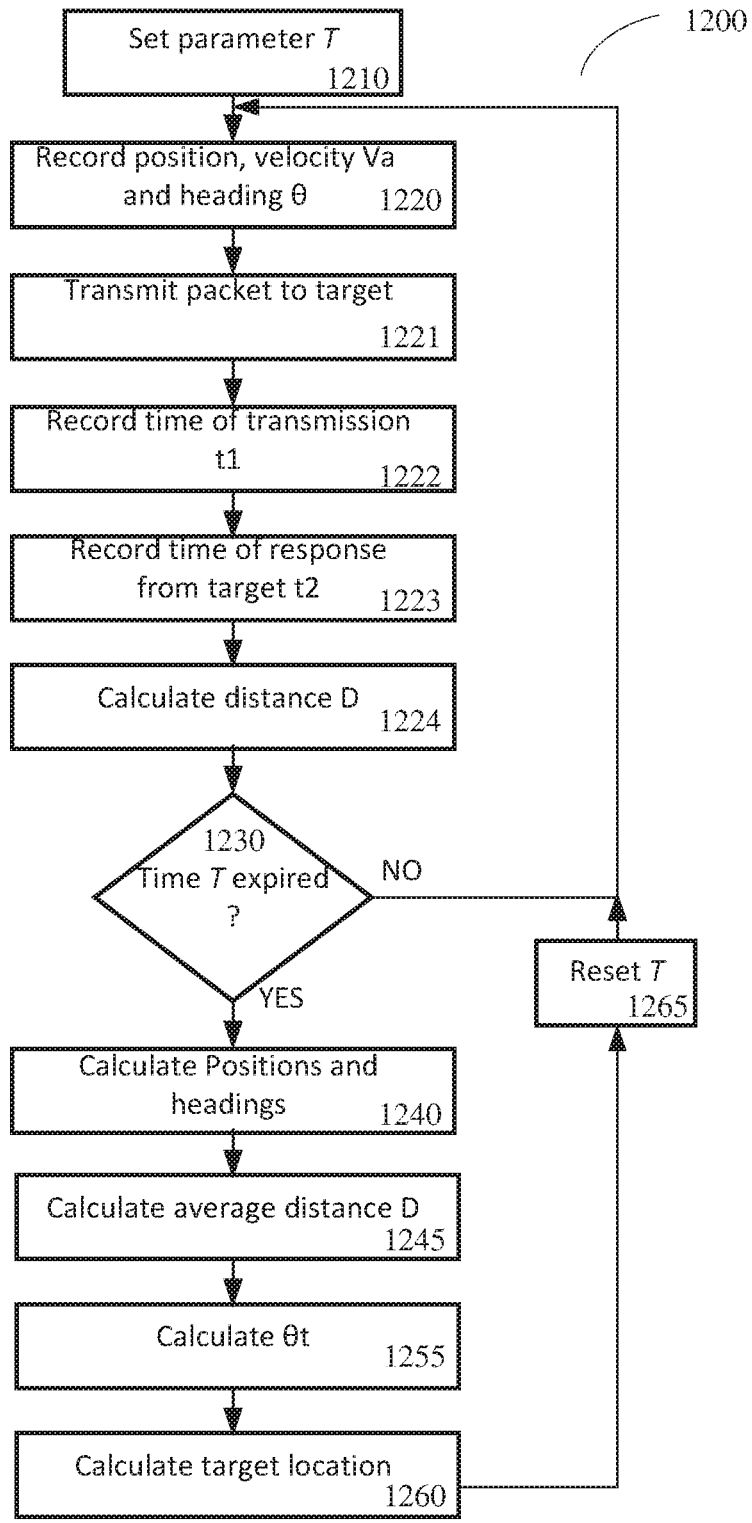
FIG. 12 is a flow diagram of a process of one embodiment of the disclosure.

FIG. 12 is a flow diagram of a process 1200 of one embodiment of the disclosure for determining a target position. Process 1200 may start at step 1210 where the parameter T is set. As described above with reference to FIGS. 7 and 8, as the airborne measuring station 110 orbits the target station 120, the direction and distance of the target station 120 from the airborne measuring station 110 is updated every time period T. The parameter T may be set by direct input from the general purpose processor 1280 or may be preset and stored in the memory module 1155. Step 1210 may be followed by step 1220 where the position, heading θ and velocity Va of the airborne measuring station 110 are recorded. The values for the position, heading and velocity may be established and/or provided by the avionics circuit 1170. Step 1220 may be followed by step 1221 where a ranging packet is transmitted by the wireless transmitter 1150 and step 1221 may be followed by step 1222 where the time that the transmission takes place, t1, is recorded. Time t1 may be recorded by the wireless receiver 1150 and in particular such as by the processing circuitry 1153. Step 1222 may be followed by step 1223 where the time t2 of the response from the target station 120 is recorded. Time t2 may be recorded by the wireless receiver 1150 and in particular such as by the processing circuitry 1153. Step 1223 may be followed by step 1224 where the distance D from the airborne measuring station 110 to the target station 120 is calculated. The calculation of the distance D may be carried out in the wireless receiver 1150 and in particular such as by the processing circuitry 1153.

Assuming that the airborne measuring station 110 and the target station 120 are Wi-Fi devices, then steps 1221, 1222, 1223 and 1224 may be as described above with reference to FIGS. 2 and 3 and the calculation of the distance D determined by equations (2) and (4) where t1=T1 and t2=T4. Step 1224 may be followed by step 1230 where a check is made to see if time T has expired. If not, then step 1230 may be followed by step 1220 and another ranging packet is transmitted. If time T has expired then step 1230 may be followed by step 1240 where the change in position of the airborne measuring station 110 is calculated together with the heading. This may be calculated using the position and heading information recorded in step 1220. The change in position may also be calculated by averaging the heading(s) and velocities recorded in step 1220. Step 1240 may be followed by step 1245 where the average distance D, as recorded in step 1224 over the time period T, is calculated. Step 1245 may be followed by step 1255 where the angle θt is calculated as described above with reference to FIGS. 5, 6 and 7 and equation (7). At step 1255, the calculation of θt may include a correction for the orbit radius of the airborne measuring station 110 as determined by equation (17). The calculations discussed above with reference to steps 1230, 1240, 1245, 1250, and 1255 may be carried out, for example, by the processing circuitry 1253. Step 1255 may be followed by step 1260 where the location of target station 120 may be calculated based upon the calculated value of θt from step 1255, and the distance D to the target station 120 as calculated in step 1245. The calculation of the distance D may be carried out, for example, by the processing circuitry 1153 and/or the general purpose processor 1180. Step 1260 may be followed by step 1265 where the time T is reset and the process returns to step 1220. As a result of process 1200, every time period T, the location of the target station 120 is calculated.

FIG. 13 is a flow diagram of a process 1300 of one embodiment of the disclosure for determining by an airborne station 110 a location of a ground-based wireless device. The process includes, at each of a plurality of positions of the airborne station 110 over a time period T (step 1310): determining, via the processing circuitry 1153, a distance between the airborne station 110 and the WD at step 1320 and recording, at memory module 1155, a velocity of the airborne station 110 and a corresponding heading of the airborne station 110 at step 1330. The process also includes, after expiration of the time period T, determining, via the processing circuitry 1153, an average velocity, average heading and average distance based at least in part on the determined, via the processing circuitry 1153, distances and recorded velocities and headings of the airborne station 110 over the time period T at step 1340. The process also includes determining, via the processing circuitry 1153, an angle between a line from the airborne station to the WD and a line from a position of the airborne station 110 at a beginning of the time period T to a position of the airborne station 110 at an end of the time period T, the angle being determined based at least in part on the average distance between the airborne station 110 and the WD at step 1350. The process further includes determining, via the processing circuitry 1153, a location of the WD based at least in part on the determined angle and the average distance at step 1360. Note that in some embodiments, at least some of the process steps attributed to processing circuitry 1153 may instead be performed by the general purpose processor 1180 and/or the processing circuitry 1112.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the time period and frequency of the transmission of the ranging packets, the timing accuracy, and the type of packets used. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

The invention claimed is:

1. A method for an airborne station for determining a location of a ground-based wireless device (WD), the method comprising:

at each of a plurality of positions of the airborne station over a time period T:
determining a distance between the airborne station and the WD; and
recording a velocity of the airborne station and a corresponding heading of the airborne station;
after expiration of the time period T, determining an average velocity and average heading of the airborne station and an average distance between the airborne station and the WD, based at least in part on the determined distances and recorded velocities and headings of the airborne station over the time period T;
determining an angle between a line from the airborne station to the WD and a line from a position of the airborne station at a beginning of the time period T to a position of the airborne station at an end of the time period T, the angle being determined based at least in part on the average distance between the airborne station and the WD; and
determining a location of the WD based at least in part on the determined angle and the average distance.

2. The method of claim 1, wherein the determined angle further depends on a distance between two positions along a heading of the airborne station.

3. The method of claim 2, wherein the two positions are the position of the airborne station at the beginning of the time period T to a position of the airborne station at the end of the time period T.

4. The method of claim 2, wherein the determined angle is θt which is obtained from:

$$\cos\theta t = -\frac{D_{AB}}{2D_B} - \frac{D_B}{2D_{AB}} + \frac{D_A^2}{2D_B D_{AB}}$$

where $D_A$ is a distance between the airborne station and the WD at the beginning of the time period T, $D_B$ is a distance between the airborne station and the WD at the end of the time period T, and $D_{AB}$ the distance between the positions of the airborne station at the beginning and end of the time period T.

5. The method of claim 2, wherein the determined angle is corrected for an orbit radius of the airborne station.

6. The method of claim 1, wherein the time period T is chosen based at least in part on a radius of curvature of a path of travel by the airborne station.

7. The method of claim 1, wherein the time period T is chosen based at least in part on a recorded velocity of the airborne station.

8. The method of claim 1, further comprising determining a change in location of the WD by averaging the velocities and corresponding headings.

9. An airborne station for determining a location of a ground-based wireless device (WD), the airborne station including processing circuitry configured to:

at each of a plurality of positions of the airborne station over a time period T:
determine a distance between the airborne station and the WD; and
recording a velocity of the airborne station and a corresponding heading of the airborne station;
after expiration of the time period T, determine an average velocity and average heading of the airborne station and an average distance between the airborne station and the WD, based at least in part on the determined distances and recorded velocities and headings of the airborne station over the time period T;

determine an angle between a line from the airborne station to the WD and a line from a position of the airborne station at a beginning of the time period T to a position of the airborne station at an end of the time period T, the angle being determined based at least in part on the average distance between the airborne station and the WD; and determine a location of the WD based at least in part on the determined angle and the average distance.

10. The airborne station of claim 9, wherein the determined angle further depends on a distance between two positions along a heading of the airborne station.

11. The airborne station of claim 10, wherein the two positions are the position of the airborne station at the beginning of the time period T to a position of the airborne station at the end of the time period T.

12. The airborne station of claim 10, wherein the determined angle is θt which is obtained from:

$$\cos\theta t = -\frac{D_{AB}}{2D_B} - \frac{D_B}{2D_{AB}} + \frac{D_A^2}{2D_B D_{AB}}$$

where $D_A$ is a distance between the airborne station and the WD at the beginning of the time period T, $D_B$ is a distance between the airborne station and the WD at the end of the time period T, and $D_{AB}$ the distance between the positions of the airborne station at the beginning and end of the time period T.

13. The airborne station of claim 10, wherein the determined angle is corrected for an orbit radius of the airborne station.

14. The airborne station of claim 9, wherein the time period T is chosen based at least in part on a radius of curvature of a path of travel by the airborne station.

15. The airborne station of claim 9, wherein the time period T is chosen based at least in part on a recorded velocity of the airborne station.

16. The airborne station of claim 9, further comprising determining a change in location of the WD by averaging the velocities and corresponding headings.

17. An airborne station configured to determine a location of a ground-based wireless device (WD), the airborne station comprising processing circuitry configured to:

determine a distance between the airborne station and the WD at a start time $t_a$ to produce distance $D_A$ and at an end time $t_b$ to produce the distance $D_B$;

determine a distance $D_{AB}$ between a position of the airborne station at the start time $t_a$, and at the end time $t_b$;

determine an angle θt from the following relationship:

$$\cos\theta t = -\frac{D_{AB}}{2D_B} - \frac{D_B}{2D_{AB}} + \frac{D_A^2}{2D_B D_{AB}};$$

and determine a location of the WD based at least in part on the determined angle and the distance $D_B$.

18. The airborne station of claim 17, wherein the determined angle is corrected for an orbit radius of the airborne station.

* * * * *